(12) United States Patent
Koike et al.

(10) Patent No.: US 11,192,132 B2
(45) Date of Patent: Dec. 7, 2021

(54) WORK FACILITY

(71) Applicant: Taikisha Ltd., Tokyo (JP)

(72) Inventors: Toshihiko Koike, Tokyo (JP); Tomoo Yamashita, Tokyo (JP)

(73) Assignee: Taikisha Ltd., Tokyo (JP)

( * ) Notice: Subject to any disclaimer, the term of this patent is extended or adjusted under 35 U.S.C. 154(b) by 0 days.

(21) Appl. No.: 17/051,386

(22) PCT Filed: Jul. 8, 2020

(86) PCT No.: PCT/JP2020/026666
§ 371 (c)(1),
(2) Date: Oct. 28, 2020

(87) PCT Pub. No.: WO2021/161555
PCT Pub. Date: Aug. 19, 2021

(65) Prior Publication Data
US 2021/0245191 A1    Aug. 12, 2021

(30) Foreign Application Priority Data

Feb. 10, 2020 (JP) .............................. JP2020-020902

(51) Int. Cl.
*B05B 14/43* (2018.01)
*B05B 16/60* (2018.01)
(Continued)

(52) U.S. Cl.
CPC ............ *B05B 14/43* (2018.02); *B01D 46/446* (2013.01); *B05B 16/60* (2018.02); *F24F 8/10* (2021.01);
(Continued)

(58) Field of Classification Search
CPC .. B05B 14/43; B05B 16/60; F24F 8/10; F24F 8/108; F24F 2110/40; F24F 11/39;
(Continued)

(56) References Cited

U.S. PATENT DOCUMENTS 4,664,061 A * 5/1987 Morioka ................. B05B 16/20
118/663
4,730,553 A * 3/1988 Osawa .................... B05B 16/95
454/52
(Continued)

FOREIGN PATENT DOCUMENTS

DE 3408087 A1 * 9/1985 ............. B05B 16/60
EP 0016698 A1 * 10/1980 ............. B05B 16/60
(Continued)

OTHER PUBLICATIONS

Limb. "Balancing Ventilation Systems". Oscar Faber Group Ltd 2001. Annex V Air Infiltration and Ventilation Centre.*
(Continued)

*Primary Examiner* — Jessica Yuen
(74) *Attorney, Agent, or Firm* — The Webb Law Firm (57) ABSTRACT

A work facility that is capable of adjusting an air volume without a work defect and saving energy. The opening degree of an air volume adjusting damper corresponding to a filter booth for which the individual air volume measured by a corresponding individual flowmeter is the smallest among the respective individual air volumes for the filter booths is adjusted to a completely open state, whereas the opening degree of any other air volume adjusting damper is adjusted to such an opening degree that the individual air volume for the corresponding filter booth as measured by a corresponding individual flowmeter is equal to the smallest individual air volume, and a gas discharge fan is adjusted by a total air volume adjusting mechanism so that a total air volume measured by a total flowmeter is equal to a predetermined target total air volume.

8 Claims, 4 Drawing Sheets

(51) Int. Cl.
*F24F 11/00* (2018.01)
*B01D 46/44* (2006.01)
*F24F 13/10* (2006.01)
*F24F 8/10* (2021.01)
*F24F 110/40* (2018.01)

(52) U.S. Cl.
CPC .......... *F24F 11/0001* (2013.01); *F24F 13/10* (2013.01); *B01D 2258/0258* (2013.01); *F24F 2110/40* (2018.01)

(58) Field of Classification Search
CPC .... F24F 2140/10; F24F 11/0001; F24F 13/10; B01D 46/446; B01D 2258/0258; Y10S 55/46
USPC ................................................ 454/53, 50, 52
See application file for complete search history.

(56) References Cited

U.S. PATENT DOCUMENTS

| | | | | |
|---|---|---|---|---|
| 4,926,746 A | * | 5/1990 | Smith | B05B 16/60 454/51 |
| 5,078,084 A | * | 1/1992 | Shutic | B05B 16/25 118/309 |
| 5,095,811 A | * | 3/1992 | Shutic | B05B 16/25 454/52 |
| 5,153,028 A | * | 10/1992 | Shutic | B05B 16/25 427/180 |
| 6,226,568 B1 | | 5/2001 | Tong et al. | |
| 6,644,092 B1 | | 11/2003 | Oppel | |
| 6,755,734 B2 | * | 6/2004 | Yokoyama | H01L 21/67017 454/187 |
| 10,671,098 B2 | * | 6/2020 | Moss | F24F 11/62 |
| 2003/0207662 A1 | * | 11/2003 | Liu | B08B 15/002 454/61 |

FOREIGN PATENT DOCUMENTS

| | | | | |
|---|---|---|---|---|
| JP | 01210069 A | * | 8/1989 | ............. B05B 16/60 |
| JP | 2000167453 A | | 6/2000 | |
| JP | 2002122346 A | | 4/2002 | |
| JP | 2015160170 A | | 9/2015 | |
| JP | 2016538118 A | | 12/2016 | |
| WO | 2015062976 A2 | | 5/2015 | |

OTHER PUBLICATIONS

"Machine Translation of EP0016698A1". 2021.*
"Machine Translation of JP01210069A". 2021.*
"Machine Translation of DE3408087A1". 2021.*

* cited by examiner

WORK FACILITY

CROSS-REFERENCE TO RELATED APPLICATIONS

This application is the United States national phase of International Application No. PCT/JP2020/026666 filed Jul. 8, 2020, and claims priority to Japanese Patent Application No. 2020-020902 filed Feb. 10, 2020, the disclosures of which are hereby incorporated by reference in their entirety.

TECHNICAL FIELD

The present invention relates to a work facility including: a work booth in which work is performed on a work target; a plurality of filter booths including respective filter units configured to allow emission gas emitted from the work booth to flow through the filter units for removal of a removal target contained in the emission gas; a gas discharge device configured to cause exhaust gas to be discharged from the filter booths from which exhaust gas the removal target has been removed; a plurality of air volume adjusting dampers having respective opening degrees adjustable to change respective individual air volumes of the exhaust gas to be discharged from the respective filter booths; a plurality of individual air volume measuring mechanisms capable of measuring the respective individual air volumes; a total air volume adjusting mechanism capable of adjusting an output of the gas discharge device to change a total air volume, which is a total of the individual air volumes; and a total air volume measuring mechanism capable of measuring the total air volume.

BACKGROUND ART

An example of the work facility is a paint facility including a plurality of filter booths with respective filter units. If clogging of a filter unit causes a pressure loss, the air volume inside the paint booth cannot be adjusted appropriately. This in turn causes an undesirable airflow such as a lateral airflow inside the paint booth, with the result that a paint defect such as a paint overlap, that is, a work defect, is more likely to occur.

To prevent such a defect, a known conventional paint facility includes air volume adjusting dampers for respective filter booths to adjust the amount of flow of air. This allows the individual filter booths to have respective pressure losses kept at the same level, thereby reducing the possibility of occurrence of an undesirable airflow inside the paint booth.

CITATION LIST

Patent Literature

Patent Literature 1

Japanese Translation of PCT International Application, Tokuhyo, No. 2016-538118

SUMMARY OF INVENTION

Technical Problem

Paint facilities such as the above are arranged such that in response to a temporal increase in the pressure loss due to clogging of a filter unit, the opening degree of the corresponding air volume adjusting damper is increased to appropriately lower the pressure loss for that filter unit. This arrangement, however, requires the paint facility to be initially operated after the opening degree of each air volume adjusting damper is decreased equivalently to a pressure loss increase due to clogging of the corresponding filter unit.

The paint facility thus needs to be initially operated as if all the filter units were suffering from a pressure loss, even though the filter units are not clogged. This requires a gas discharge fan to produce a large output accordingly, problematically making energy saving difficult.

The present invention has been accomplished in view of the above circumstances. It is an object of the present invention to provide a work facility capable of adjusting an air volume without a work defect and saving energy.

Solution to Problem

A work facility according to the present invention is characteristically a work facility including: a work booth in which work is performed on a work target; a plurality of filter booths including respective filter units configured to allow emission gas emitted from the work booth to flow through the filter units for removal of a removal target contained in the emission gas; a gas discharge device configured to cause exhaust gas to be discharged from the filter booths from which exhaust gas the removal target has been removed; a plurality of air volume adjusting dampers having respective opening degrees adjustable to change respective individual air volumes of the exhaust gas to be discharged from the respective filter booths; a plurality of individual air volume measuring mechanisms capable of measuring the respective individual air volumes; a total air volume adjusting mechanism capable of adjusting an output of the gas discharge device to change a total air volume, which is a total of the individual air volumes; and a total air volume measuring mechanism capable of measuring the total air volume, wherein the opening degree of that one of the air volume adjusting dampers which corresponds to that one of the filter booths for which the individual air volume measured by a corresponding one of the individual air volume measuring mechanisms is smallest among the respective individual air volumes for the filter booths is adjusted to a completely open state, whereas the opening degree of any other one of the air volume adjusting dampers is adjusted to such an opening degree that the individual air volume for a corresponding one of the filter booths as measured by a corresponding one of the individual air volume measuring mechanisms is equal to the smallest individual air volume, and the gas discharge device is adjusted by the total air volume adjusting mechanism so that the total air volume measured by the total air volume measuring mechanism is equal to the predetermined target total air volume.

With the above arrangement, the work facility is operated while the opening degree of the air volume adjusting damper corresponding to the filter booth for which the individual air volume is the smallest among the respective individual air volumes for the filter booths is in the completely open state. Thus, as compared to a case of a work facility being operated while the opening degree of no air volume adjusting damper is in the completely open state as conventional, the above arrangement allows the gas discharge device to produce a reduced output and saves energy accordingly. Adjusting the opening degree of an air volume adjusting damper to change the individual air volume for the filter booth corresponding to that air volume adjusting damper changes the individual air volume for any other filter booth as well. Repeating the adjustment for each air volume adjusting damper and the adjustment of the gas discharge device allows each air volume adjusting damper to have an appropriate opening degree so that the respective individual air volumes for the filter booths are equal to one another. The individual air volume measuring mechanisms and the total air volume measuring mechanism may each be a publicly known airflow meter such as an airflow meter of a differential pressure type or of an impeller type.

The individual air volume for a filter booth being equal to that of another filter booth means not only an obvious case of the two individual air volumes being exactly equal to each other, but also a case of the two individual air volumes being different from each other only to such a degree that no undesirable airflow such as a lateral airflow occurs in the work booth. The term "individual air volume" as used for the present invention and in the description thereof may refer to not only an actual air volume, but also an air volume as measured by an individual air volume measuring mechanism. Similarly, the term "total air volume" may refer to not only an actual air volume, but also an air volume as measured by the total air volume measuring mechanism. The term "predetermined" as used for the present invention and in the description thereof refers to not only something particular, but also something in a particular range.

While the work facility is in operation, the respective opening degrees of the individual air volume adjusting dampers are adjusted so that the respective individual air volumes are equal to one another. This prevents an undesirable airflow such as a lateral airflow in the work booth, thereby making a work defect less likely.

The adjustment for the air volume adjusting dampers and the adjustment of the gas discharge device may be repeated each time the total air volume is decreased by a predetermined amount or each time a predetermined time period elapses.

A work facility according to the present invention is suitably arranged such that before the adjustment for the air volume adjusting dampers and the adjustment of the gas discharge device are performed, first, the respective opening degrees of the air volume adjusting dampers are each adjusted to the completely open state, and the gas discharge device is adjusted by the total air volume adjusting mechanism so that the total air volume measured by the total air volume measuring mechanism is equal to the predetermined target total air volume, and subsequently, the opening degree of that one of the air volume adjusting dampers which corresponds to that one of the filter booths for which the individual air volume measured by the corresponding one of the individual air volume measuring mechanisms is smallest among the respective individual air volumes for the filter booths is adjusted to the completely open state, whereas the opening degree of any other one of the air volume adjusting dampers is adjusted to such an opening degree that the individual air volume for the corresponding one of the filter booths as measured by the corresponding one of the individual air volume measuring mechanisms is equal to the smallest individual air volume, and the gas discharge device is adjusted by the total air volume adjusting mechanism so that the total air volume measured by the total air volume measuring mechanism is equal to the predetermined target total air volume.

When the work facility starts its operation for the first time, the filter units have not yet collected a removal target. Thus, the filter units themselves have respective pressure losses basically equal to one another. The filter booths, however, suffer from respective pressure losses each depending on the path from the filter booth to the gas discharge device, the pressure losses being different from each other. Allowing the filter booths to have respective individual air volumes equal to one another requires the opening degree of each air volume adjusting damper to be adjusted appropriately.

Before the adjustment for the air volume adjusting dampers and the adjustment of the gas discharge device, that is, when the work facility starts its operation for the first time, first, (i) the respective opening degrees of the air volume adjusting dampers are each adjusted to the completely open state, and (ii) the gas discharge device is adjusted by the total air volume adjusting mechanism so that the total air volume is equal to the target total air volume, and subsequently, (i) the opening degree of the air volume adjusting damper corresponding to the filter booth for which the individual air volume is the smallest among the respective individual air volumes for the filter booths is kept in the completely open state, whereas the opening degree of any other air volume adjusting damper is adjusted to such an opening degree that the individual air volume for the other filter booth is equal to the individual air volume for a filter booth corresponding to an air volume adjusting damper whose opening degree has been adjusted to the completely open state, and (ii) the gas discharge device is adjusted by the total air volume adjusting mechanism so that the total air volume is equal to the predetermined target total air volume. This allows the work facility to start its operation while (i) the opening degree of the air volume adjusting damper corresponding to the filter booth for which the pressure loss along the path from the filter booth to the gas discharge device is the largest among the filter booths is adjusted to the completely open state and (ii) the individual air volumes are equal to one another.

A work facility according to the present invention is suitably arranged such that when operation of the work facility is suspended and is resumed later, the respective opening degrees of all the air volume adjusting dampers are in respective states in which the respective opening degrees were immediately before the suspension.

When the operation of the work facility is suspended and is resumed later, keeping the respective opening degrees of the air volume adjusting dampers in states in which the respective opening degrees were immediately before the suspension as in the above arrangement eliminates the need for the adjustment for the air volume adjusting dampers and the adjustment of the gas discharge device to be performed as when the work facility starts its operation for the first time. This allows the work facility to resume its operation early.

A work facility according to the present invention is suitably arranged such that the respective opening degrees of the air volume adjusting dampers are manually adjustable directly or indirectly.

The respective opening degrees of the air volume adjusting dampers being manually adjustable directly as in the above arrangement allows the work facility to have a simplified structure. The respective opening degrees of the air volume adjusting dampers being manually adjustable indirectly via, for example, damper operators outside the filter booth room allows the respective opening degrees of the air volume adjusting dampers to be adjusted remotely in a convenient manner.

A work facility according to the present invention suitably includes a plurality of damper controlling mechanisms configured to adjust the respective opening degrees of the air volume adjusting dampers on a basis of the respective individual air volumes, wherein the respective opening degrees of the air volume adjusting dampers are each automatically adjustable by a corresponding one of the damper controlling mechanisms.

The respective opening degrees of the air volume adjusting dampers being automatically adjustable with use of the respective damper controlling mechanisms as in the above arrangement allows an air volume to be adjusted more easily, accurately, and reliably.

A work facility according to the present invention suitably includes a plurality of differential pressure measuring mechanisms capable of measuring respective differential pressures of the filter units, wherein at least in (i) a case where the gas discharge device has been adjusted by the total air volume adjusting mechanism or in (ii) a case where the respective opening degrees of the air volume adjusting dampers have been adjusted, and any of the filter units has a differential pressure measured by a corresponding one of the differential pressure measuring mechanisms which differential pressure exceeds a predetermined upper limit differential pressure, replacement of said any of the filter units is prompted.

The above arrangement allows replacement of a filter unit having collected a removal target in a large amount up to or close to the limit of its collecting capacity. This allows filter units to be used more efficiently.

A work facility according to the present invention is suitably arranged such that in a case where (i) the output of the gas discharge device has become maximum as a result of the total air volume adjusting mechanism adjusting the gas discharge device, and (ii) the individual air volume for that one of the filter booths which corresponds to that one of the air volume adjusting dampers whose opening degree is in the completely open state, the individual air volume being measured by a corresponding one of the individual air volume measuring mechanisms, is lower than a predetermined lower limit individual air volume, replacement of said any of the filter units is prompted.

The above arrangement allows replacement of a filter unit having collected a removal target in a large amount up to or close to the limit of its collecting capacity. This allows filter units to be used more efficiently.

A work facility according to the present invention is suitably arranged such that when one of the filter units is to be replaced, the filter unit to be replaced is detachable in a state where the opening degree of that one of the air volume adjusting dampers which corresponds to that one of the filter booths which includes the filter unit to be replaced is adjusted to the completely closed state, whereas the opening degree of any other one of the air volume adjusting dampers is adjusted to be larger so as to keep the total air volume achieved immediately before that one of the air volume adjusting dampers which corresponds to that one of the filter booths which includes the filter unit to be replaced became completely closed, and after a replacement filter unit is attached, the opening degree of that one of the air volume adjusting dampers which corresponds to that one of the filter booths which includes the replacement filter unit is adjusted to an opening degree equal to an opening degree to which that one of the air volume adjusting dampers which corresponds to that one of the filter booths which includes the replacement filter unit was adjusted when the filter unit having been replaced was unused, whereas the opening degree of said any other one of the air volume adjusting dampers is adjusted back to an opening degree that said any other one of the air volume adjusting dampers had before the opening degree of said any other one of the air volume adjusting dampers was adjusted to be larger.

With the above arrangement, the opening degree of the air volume adjusting damper corresponding to the filter booth including a filter booth to be replaced is in the completely open state as a result of the individual air volume for the filter booth being adjusted before the replacement of the filter unit. This allows the opening degree of the air volume adjusting damper to, after the replacement of the filter unit, be adjusted back to the opening degree that the air volume adjusting damper had when the work facility started its operation for the first time. The respective opening degrees of the air volume adjusting dampers are adjusted appropriately when a filter unit is replaced. This allows a filter unit to be replaced with no large change in the total air volume while the work facility is kept in operation.

A work facility according to the present invention is suitably arranged such that after said one of the filter units is replaced, (i) the gas discharge device is adjusted by the total air volume adjusting mechanism so that the total air volume measured by the total air volume measuring mechanism is equal to the predetermined target total air volume, and (ii) the opening degree of that one of the air volume adjusting dampers which corresponds to that one of the filter booths for which the individual air volume measured by the corresponding one of the individual air volume measuring mechanisms is smallest among the respective individual air volumes for the filter booths is kept in the completely open state, whereas the opening degree of any other one of the air volume adjusting dampers is adjusted to such an opening degree that the individual air volume measured by the corresponding one of the individual air volume measuring mechanisms is equal to the smallest individual air volume.

The present invention allows the total air volume to be adjusted first after replacement of a filter unit. This shortens the time period necessary for the adjustment for the air volume adjusting dampers and thereby allows work to be resumed early.

A work facility according to the present invention is suitably arranged such that the work is painting, the work target is a paint target, and the work booth is a paint booth.

The above arrangement allows an air volume to be adjusted without a paint defect as the work defect in a paint facility as the work facility.

DESCRIPTION OF EMBODIMENTS

The description below deals with a paint facility as an example of the work facility according to the present invention. The example involves (i) painting as the work for the present invention, (ii) a paint target as the work target for the present invention, (iii) a paint booth as the work booth for the present invention, and (iv) overspray contained in emission gas emitted from a paint booth as the removal target for the present invention.

First Embodiment

The description below deals with a first embodiment of the paint facility according to the present invention with reference to drawings.

(Paint Facility)

Figure 1:
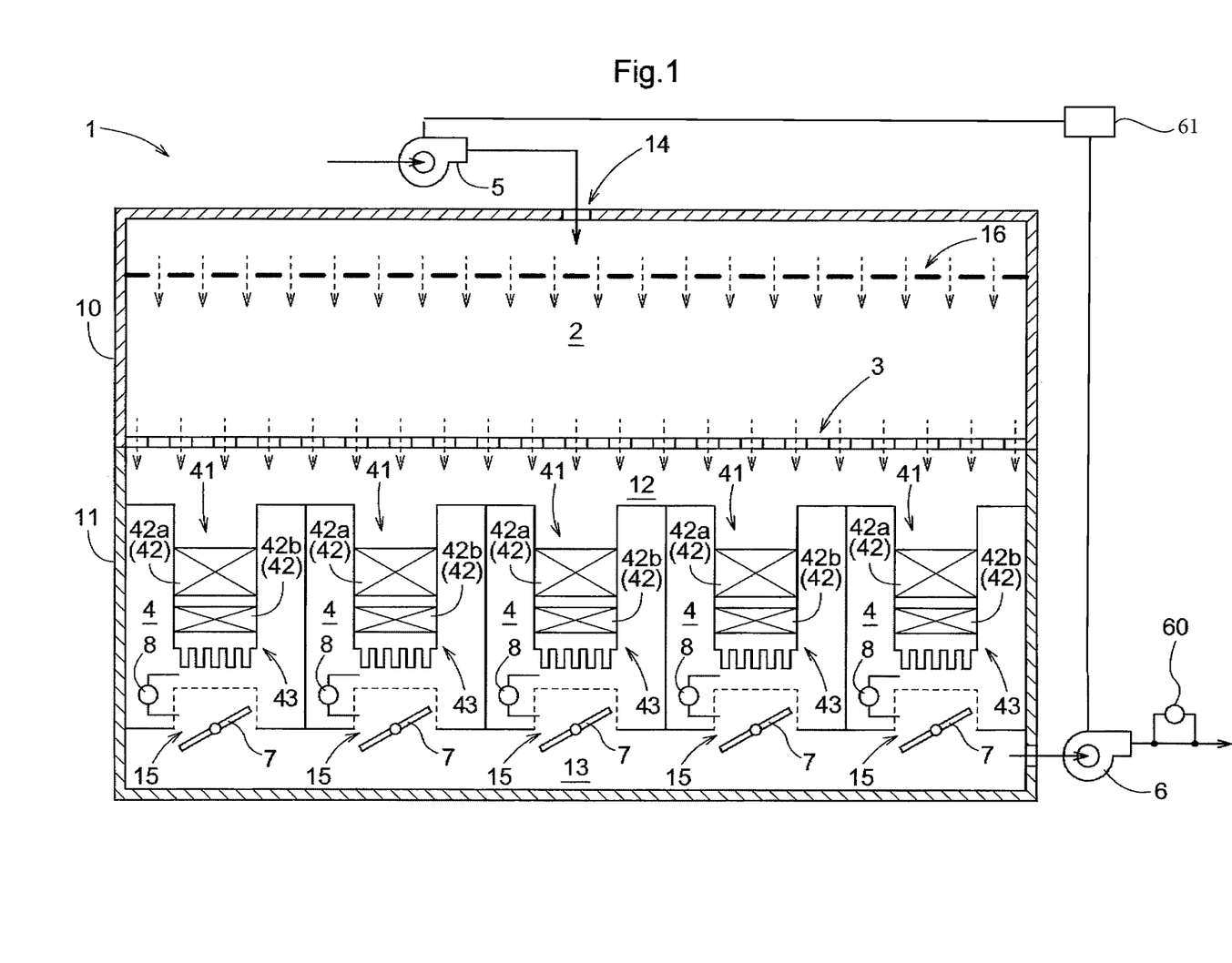
FIG. 1 is a diagram schematically illustrating the arrangement of a first embodiment of a paint facility.

FIG. 1 illustrates a paint facility 1 including (i) a paint booth 2 configured to spray paint on the body of an automobile as an example of the paint target, (ii) a plurality of filter booths 4 each configured to allow emission gas emitted downward through a work floor 3 of the paint booth 2 to flow through the filter booth 4 for removal of overspray contained in the emission gas, (iii) an air supply fan 5 as an example of an air supply device configured to supply air to the paint booth 2, and (iv) a gas discharge fan 6 as an example of a gas discharge device configured to discharge exhaust gas from which overspray has been removed through the filter booths 4. The air supply fan 5 and the gas discharge fan 6 are adjusted appropriately by a total air volume adjusting mechanism 61, so that the paint booth 2 can maintain an appropriate internal pressure. The total air volume adjusting mechanism 61 is configured to, for example, allow an electric motor to be controlled manually or automatically with use of an inverter to change the volume of air through the air supply fan 5 and the gas discharge fan 6. FIG. 1 shows the total air volume adjusting mechanism 61 directly connected to both the air supply fan 5 and the gas discharge fan 6. Although FIGS. 2-4 do not show a single total air volume adjusting mechanism 61 connected to both the air supply fan 5 and the gas discharge fan 6, one of skill in the art would understand, based on the present disclosure, that the total air volume adjusting mechanism 61, is still connected to and adjusts both the air supply fan 5 and the gas discharge fan 6 whether it is arranged in the configuration shown in FIG. 1 or the configuration shown in FIGS. 2-4.

The paint booth 2 includes a paint booth room 10 containing, for example, (i) a conveyor mechanism (not shown in the drawings) configured to carry automobile bodies into and out of the paint booth room 10 and (ii) a spray device (not shown in the drawings) configured to spray a predetermined painting material onto the automobile bodies, carried in by the conveyor mechanism, from around the automobile bodies.

The paint booth 2 has a top face having an air supply opening 14. The paint facility 1 includes, for example, an air conditioner (not shown in the drawings) in addition to the air supply fan 5 upstream of the air supply opening 14. Fresh air supplied through the air supply opening 14 passes through a dust removing filter 16 for dust removal before flowing down inside the paint booth 2. The air supply fan 5 desirably includes an inverter.

The work floor 3 of the paint booth 2 includes, for example, a grating, and allows air in the paint booth 2 to flow downward therethrough. Turning on the gas discharge fan 6 causes air present inside the paint booth 2 and containing overspray to be emitted from the paint booth 2 through the work floor 3 as emission gas into the filter booths 4.

The plurality of filter booths 4 are all contained in a filter booth room 11 present under the paint booth room 10 and integrally adjacent thereto. The filter booth room 11, in other words, encloses a space under the work floor 3. The paint booth room 10 and the filter booth room 11 may alternatively be two separate rooms.

The filter booth room 11 has a guide flow path 12 configured to (i) receive emission gas emitted through the work floor 3 of the paint booth 2 and then (ii) distribute and guide the emission gas to the plurality of filter booths 4.

The work floor 3 and the filter booths 4 differ from each other in terms of the speed at which air passes therethrough. The plurality of filter booths 4 have a total horizontal projection area that is smaller than the projection area of the work floor 3 of the paint booth 2. The filter booth room 11 thus has a guide flow path 12 under the work floor 3 so that emission gas is emitted to the individual filter booths 4 through the guide flow path 12. The guide flow path 12 has a height that prevents contact between, for example, a rail included in the conveyor mechanism and the filter booths 4.

The filter booth room 11 also has an exhaust gas flow path 13 configured to collect exhaust gas discharged from the plurality of filter booths 4. The gas discharge fan 6 is present downstream of the exhaust gas flow path 13. The paint facility 1 includes a total flowmeter 60 (orifice flowmeter) as an example of the total air volume measuring mechanism, the total flowmeter 60 being configured to measure the total volume of exhaust gas discharged by the gas discharge fan 6.

The filter booths 4 each include a filter unit 41 configured to remove overspray contained in emission gas emitted from the paint booth 2. Emission gas emitted through the work floor 3 of the paint booth 2 downward into the guide flow path 12 is caused to flow through the filter units 41. The paint facility 1 may alternatively omit the guide flow path 12, so that emission gas emitted through the work floor 3 is caused to directly flow through the filter units 41.

The filter units 41 each include an upstream element 42 present upstream in the airflow direction and a downstream element 43 optionally present downstream in the airflow direction to increase the performance of collecting overspray.

A major portion of overspray contained in emission gas emitted from the paint booth 2 can be collected with use of even the upstream element 42, which has a relatively low collecting performance.

The upstream element 42 has an overspray collecting performance lower than that of the downstream element 43, and includes, for example, a mist separator 42a made of paper and an auxiliary filter 42b made of nonwoven fabric.

The mist separator 42a is in the form of a box that is made by appropriately bending a cardboard or kraft sheet and that has an airflow path inside. The mist separator 42a receives emission gas containing overspray at an entrance portion thereof. As the emission gas passes through the airflow path, the overspray collides with and adheres to a wall surface of the airflow path. The mist separator 42a thus discharges exhaust gas from an exit portion thereof from which exhaust gas the overspray has been removed.

The upstream element 42, which is configured to remove a major portion of overspray and tends to need to be replaced frequently, includes a mist separator 42a made of paper and an auxiliary filter 42b made of nonwoven fabric as described above. This allows overspray to be collected inexpensively.

The downstream element 43, in contrast, has an overspray collecting performance higher than that of the upstream element 42.

The downstream element 43 includes a medium-performance filter made of nonwoven fabric. The medium-performance filter has a large pressure loss per unit area as compared to the upstream element 42, and is thus, for example, pleated or bag-shaped for an increased filtration area. This prevents the overall pressure loss from becoming excessively large.

Overspray that the upstream element 42 could not collect can be collected with use of the downstream element 43, which has a relatively high performance.

Overspray that the upstream element 42 could not collect can be collected sufficiently with use of the medium-performance filter as the downstream element 43.

The upstream element 42 and downstream element 43 of each filter unit 41 are placed on respective placement frames to be capable of being replaced separately depending on the degree of degradation due to overspray collection.

The filter booths 4 each have a discharge opening 15 configured to discharge, to the exhaust gas flow path 13, air from which overspray has been removed through the filter unit 41. The filter booths 4 each include, at the discharge opening 15, an air volume adjusting damper 7 capable of adjusting the individual air volume for the filter booth 4. The air volume adjusting damper 7 for the present embodiment is operated manually.

Adjusting the opening degree of the air volume adjusting damper 7 can adjust the individual air volume for the filter unit 41 included in the corresponding filter booth 4, which individual air volume decreases depending on the degree of clogging of the filter unit 41.

The degree of clogging of each filter unit 41 may be evaluated on the basis of (i) an actually measured individual air volume (measured individual air volume) or (ii) an air volume rate calculated by dividing the measured individual air volume by a target individual air volume. The degree of clogging of each filter unit 41 can be evaluated on the basis of the air volume rate as follows: If the measured individual air volume is small compared to the target individual air volume, the air volume rate is smaller than 1. If the measured individual air volume is large as compared to the target individual air volume, the air volume rate is larger than 1. A filter booth 4 with an air volume rate of smaller than 1 is evaluated as having a measured individual air volume that is small for the opening degree of the air volume adjusting damper 7. For such a filter booth 4, the air volume adjusting damper 7 is adjusted to have a larger opening degree. A filter booth 4 with an air volume rate of larger than 1 is evaluated as having a measured individual air volume that is large for the opening degree of the air volume adjusting damper 7. For such a filter booth 4, the air volume adjusting damper 7 is adjusted to have a smaller opening degree.

The filter booths 4 each include (i) a differential pressure measuring mechanism (not shown in the drawings) configured to measure a differential pressure of the filter unit 41 and (ii) an individual flowmeter 8 (orifice flowmeter) as an example of the individual air volume measuring mechanism, the individual flowmeter 8 being configured to measure the individual air volume for the filter unit 41. The individual flowmeter 8 is present between the filter unit 41 and the air volume adjusting damper 7.

(Method for Adjusting Air Volume)

Figure 4:
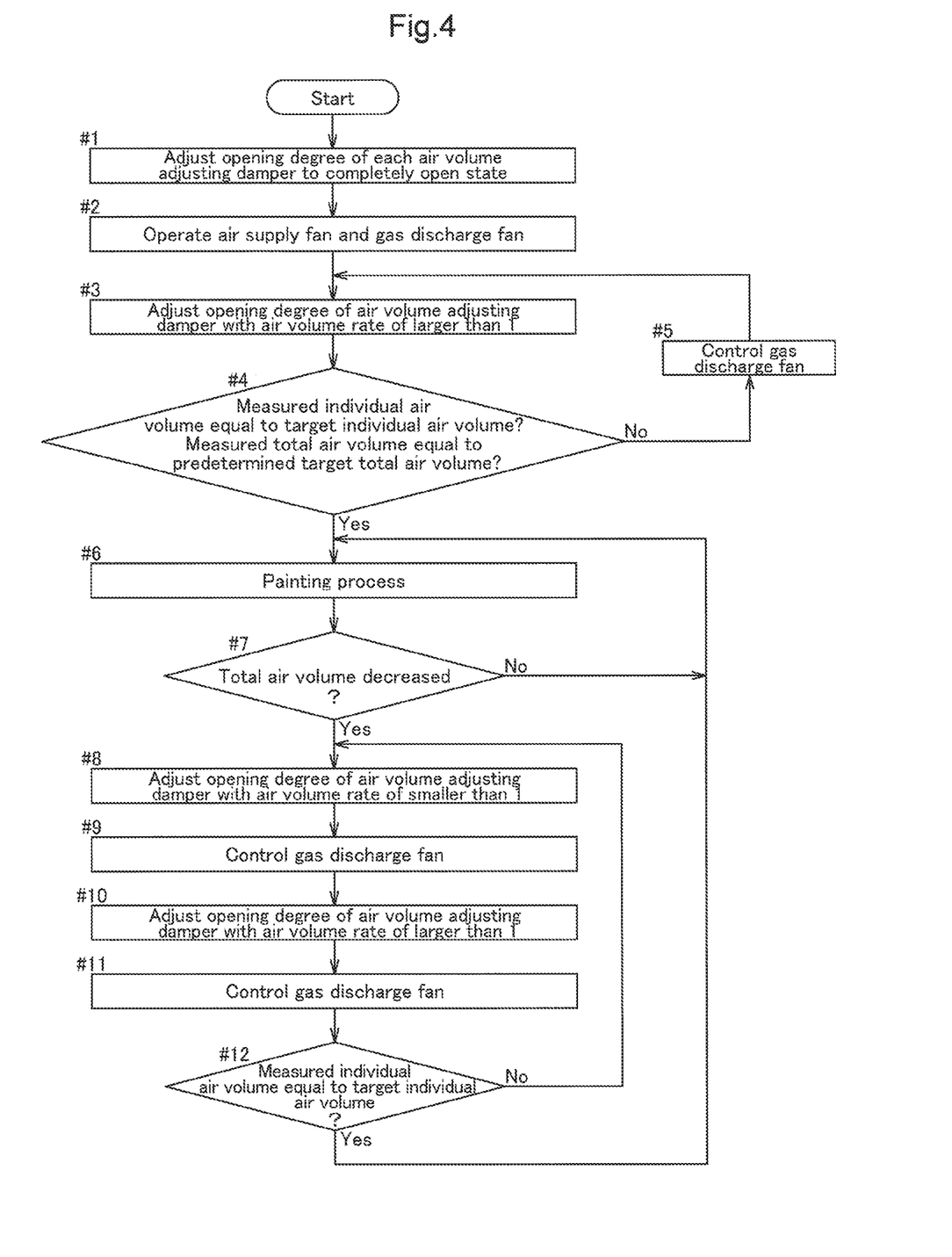
FIG. 4 is a flowchart illustrating a method for adjusting the air volume.

The description below deals with how the paint facility 1 as the present embodiment adjusts the air volume, with reference to FIG. 4.

Before the start of a painting process by the paint facility 1, an operator adjusts the opening degree of the air volume adjusting damper 7 of each filter booth 4 to a completely open state (#1). In this state, the air supply fan 5 and the gas discharge fan 6 are turned on. The air supply fan 5 runs at a predetermined rotation speed, while the gas discharge fan 6 is adjusted by the total air volume adjusting mechanism so that the total air volume measured by the total flowmeter 60 is equal to a predetermined target total air volume (#2). This causes the paint booth 2 to have a predetermined target room pressure.

After the internal airflow of the paint booth 2 becomes stable, the individual air volume for each filter booth 4 is measured with use of the individual flowmeter 8. The operator adjusts the opening degree of the air volume adjusting damper 7 of any filter booth 4 with an air volume rate of larger than 1 so that the measured individual air volume is equal to the target individual air volume (#3).

Adjusting the opening degree of the air volume adjusting damper 7 as described above decreases the total air volume, which is the total of individual air volumes (No in #4). Thus, the gas discharge fan 6 is adjusted by the total air volume adjusting mechanism 61 so that the measured total air volume is equal to the predetermined target total air volume (#5).

When the respective individual air volumes of all the filter booths 4 have been adjusted so as to be equal to one another (Yes in #4), the operator remembers the opening degree of each air volume adjusting damper 7 as an initial value. This is the end of the initialization.

As described above, the opening degree of each air volume adjusting damper 7 is adjusted to the completely open state. The gas discharge fan 6 is adjusted by the total air volume adjusting mechanism 61 so that the measured total air volume is equal to a predetermined target total air volume. Subsequently, the opening degree of the air volume adjusting damper 7 of the filter booth 4 with the smallest measured individual air volume is adjusted to the completely open state. The opening degree of any other air volume adjusting damper 7 is adjusted so that its measured individual air volume is equal to the smallest measured individual air volume. The gas discharge fan 6 is adjusted by the total air volume adjusting mechanism 61 so that the measured total air volume is equal to the predetermined target total air volume.

After the internal airflow of the paint booth 2 becomes stable, automobile bodies start to be carried into the paint booth 2 for the start of the painting process (#6).

During the painting process, if a filter unit 41 is clogged by overspray, the individual air volume for the filter booth 4 is decreased, thereby causing a decrease in the total air volume.

The operator checks whether the measured total air volume is smaller than the target total air volume to determine whether the total air volume has been decreased (#7).

If the total air volume has been decreased (Yes in #7), the painting process is suspended, and the operator checks the air volume rate of each filter booth 4. The operator adjusts the opening degree of the air volume adjusting damper 7 of any filter booth 4 with an air volume rate of smaller than 1 (#8).

Adjusting the opening degree of the air volume adjusting damper 7 as described above changes the total air volume, which is the total of individual air volumes. The gas discharge fan 6 is thus adjusted by the total air volume adjusting mechanism 61 so that the measured total air volume is equal to the target total air volume (#9).

After the internal airflow of the paint booth 2 becomes stable, the operator checks the air volume rate of each filter booth 4. The operator adjusts the opening degree of the air volume adjusting damper 7 of any filter booth 4 with an air volume rate of larger than 1 (#10).

Adjusting the opening degree of the air volume adjusting damper 7 as described above changes the total air volume, which is the total of individual air volumes. The gas discharge fan 6 is thus adjusted by the total air volume adjusting mechanism 61 so that the measured total air volume is equal to the target total air volume (#11).

After the internal airflow of the paint booth 2 becomes stable, the operator checks whether the measured individual air volume for each filter booth 4 is equal to the target individual air volume (#12).

Steps #8 to #12 are repeated until the measured individual air volume for each filter booth 4 is equal to the target individual air volume (No in #12).

The above procedure is as follows: The opening degree of the air volume adjusting damper 7 of the filter booth 4 with the smallest measured individual air volume is adjusted to the completely open state. The opening degree of any other air volume adjusting damper 7 is adjusted so that its measured individual air volume is equal to the smallest measured individual air volume. The gas discharge fan 6 is adjusted by the total air volume adjusting mechanism 61 so that the measured total air volume is equal to the predetermined target total air volume.

If the measured individual air volume for each filter booth 4 is equal to the target individual air volume (Yes in #12), the painting process is resumed (#6).

While steps #6 to #12 are repeated, if the measured total air volume shows a decrease (Yes in #7), if the opening degree of an air volume adjusting damper 7 has been adjusted (#8, #10), or if the gas discharge fan 6 has been adjusted (#9, #11), whether the filter units 41 each need replacing is determined. If, after each of steps #7 to #11, any filter unit 41 has a differential pressure as measured with use of the differential pressure measuring mechanism which differential pressure exceeds a predetermined upper limit differential pressure, it is determined that that filter unit 41 needs replacing. If it has been determined that a filter unit 41 needs replacing, an alarm is triggered to that effect.

While steps #6 to #12 are repeated, if the gas discharge fan 6 has been adjusted (#9, #11), whether the filter units 41 each need replacing is determined. If the gas discharge fan 6 has been adjusted to produce its maximum output, and any air volume adjusting damper 7 with an opening degree in the completely open state has an air volume rate of smaller than 1, it is determined that the filter unit 41 of the filter booth 4 including that air volume adjusting damper 7 needs replacing. If it has been determined that a filter unit 41 needs replacing, an alarm is triggered to that effect.

A filter unit 41 is replaced through the following procedure: The opening degree of the air volume adjusting damper 7 included in the filter booth 4 including a filter unit 41 to be replaced is adjusted to a completely closed state. The opening degree of any other air volume adjusting damper 7 is adjusted to be larger so as to keep the total air volume achieved immediately before the air volume adjusting damper 7 included in the filter booth 4 including the filter unit 41 to be replaced became completely closed. In this state, the filter unit 41 to be replaced is detached.

After a new filter unit 41 is attached, the opening degree of the air volume adjusting damper 7 included in the filter booth 4 including the new filter unit 41 is adjusted to the initial value. The opening degree of any other air volume adjusting damper 7 is adjusted to the opening degree kept before it was adjusted to be larger.

Subsequently, the gas discharge fan 6 is adjusted by the total air volume adjusting mechanism 61 so that the measured total air volume is equal to the predetermined target total air volume (#5), and all the filter booths 4 have respective individual air volumes equal to one another (Yes in #4). After the internal airflow of the paint booth 2 becomes stable, the painting process is resumed (#6).

The above procedure is as follows: After a filter unit 41 is replaced, the gas discharge fan 6 is adjusted by the total air volume adjusting mechanism 61 so that the measured total air volume is equal to a predetermined target total air volume. The opening degree of the air volume adjusting damper 7 of the filter booth 4 with the smallest measured individual air volume is kept in the completely open state. In this state, the opening degree of any other air volume adjusting damper 7 is adjusted so that its measured individual air volume is equal to the smallest measured individual air volume.

Second Embodiment

Figure 2:
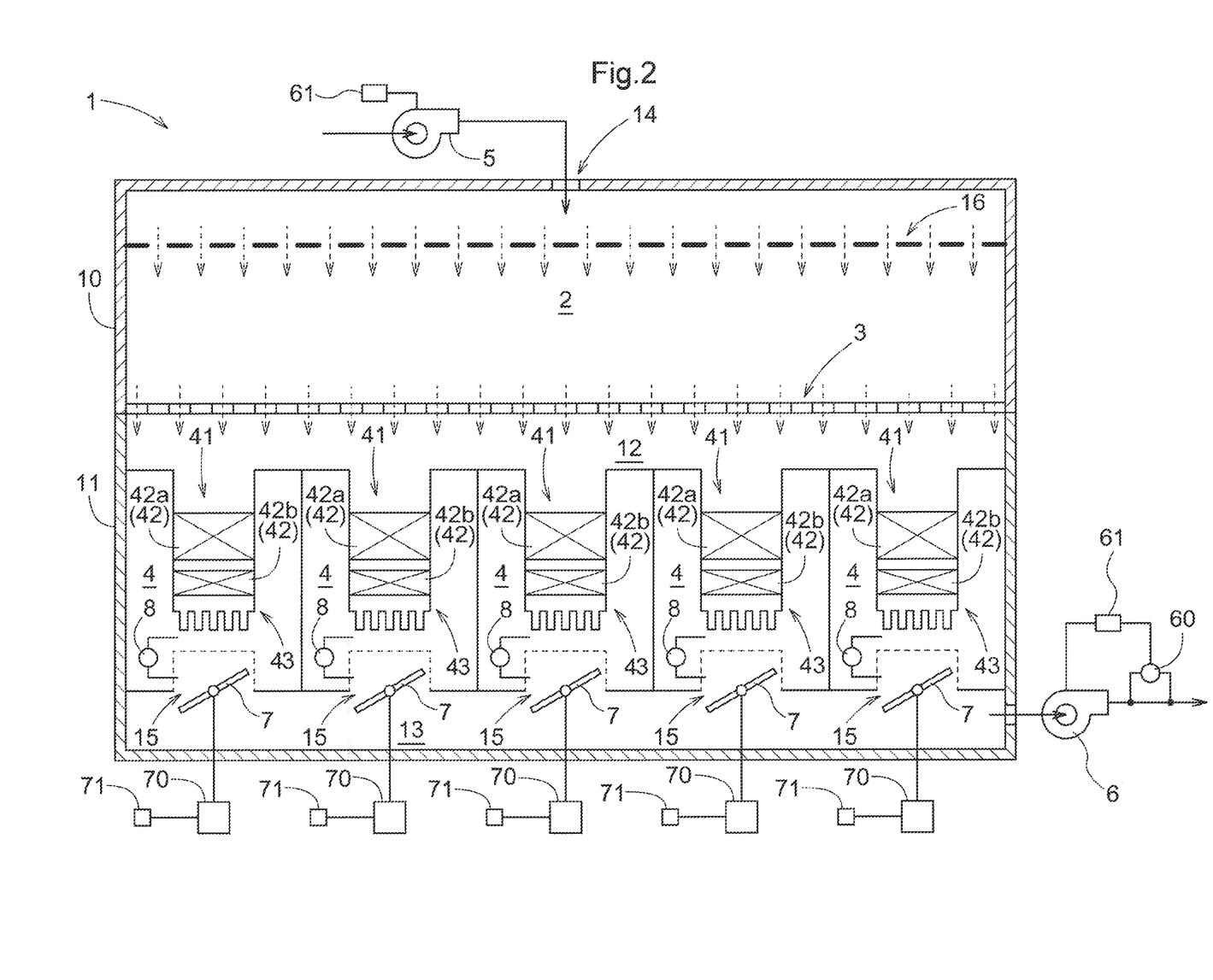
FIG. 2 is a diagram schematically illustrating the arrangement of a second embodiment of a paint facility.

The description below deals with a second embodiment of the paint facility 1 according to the present invention with reference to FIG. 2. Any member of the present embodiment that is similar to a member of the first embodiment above is assigned the same reference sign, and is not described here. The description below thus mainly deals with differences as compared to the first embodiment.

(Paint Facility)

The paint facility 1 as the present embodiment includes (i) a plurality of actuators 70 each configured to adjust the opening degree of the corresponding air volume adjusting damper 7 and (ii) a plurality of damper operators 71 each configured to operate the corresponding actuator 70. An operator can operate the damper operators 71 to remotely operate the air volume adjusting dampers 7 via the actuators 70.

The gas discharge fan 6 included in the paint facility 1 as the present embodiment includes a total air volume controller 61 (which is an example of the "total air volume adjusting mechanism") configured to automatically adjust the output of the gas discharge fan 6 on the basis of the result of measurement by the total flowmeter 60. If, for instance, clogging due to overspray has changed the total air volume, the total air volume controller 61 automatically adjusts the gas discharge fan 6 to change the total air volume accordingly.

(Method for Adjusting Air Volume)

The description below deals with how the paint facility 1 as the present embodiment adjusts the air volume while the paint facility 1 is in operation. The overall flow is similar to the air volume adjusting method for the first embodiment above. The description below covers the overlap as well with reference to FIG. 4.

Before the start of a painting process by the paint facility 1, an operator operates the damper operator of each filter booth 4 to adjust the opening degree of the corresponding air volume adjusting damper 7 via the corresponding actuator 70 to a completely open state (#1). In this state, the air supply fan 5 and the gas discharge fan 6 are turned on. The air supply fan 5 runs at a predetermined rotation speed, while the gas discharge fan 6 is adjusted by the total air volume controller 61 so that the total air volume measured by the total flowmeter 60 is equal to a predetermined target total air volume (#2). This causes the paint booth 2 to have a predetermined target room pressure. The total air volume controller 61 stores information on the target total air volume.

After the internal airflow of the paint booth 2 becomes stable, the individual air volume for each filter booth 4 is measured with use of the individual flowmeter 8. The operator adjusts the opening degree of the air volume adjusting damper 7 of any filter booth 4 with an air volume rate of larger than 1 through operation of the corresponding damper operator so that the measured individual air volume is equal to the target individual air volume (#3).

Adjusting the opening degree of the air volume adjusting damper 7 as described above decreases the total air volume, which is the total of individual air volumes (No in #4). Thus, the gas discharge fan 6 is adjusted by the total air volume controller 61 so that the measured total air volume is equal to the predetermined target total air volume (#5).

When the respective individual air volumes of all the filter booths 4 have been adjusted so as to be equal to one another (Yes in #4), the operator records the opening degree of each air volume adjusting damper 7 as an initial value. This is the end of the initialization.

As described above, the opening degree of each air volume adjusting damper 7 is adjusted to the completely open state. The gas discharge fan 6 is adjusted by the total air volume controller 61 so that the measured total air volume is equal to a predetermined target total air volume. Subsequently, the opening degree of the air volume adjusting damper 7 of the filter booth 4 with the smallest measured individual air volume is adjusted to the completely open state. The opening degree of any other air volume adjusting damper 7 is adjusted so that its measured individual air volume is equal to the smallest measured individual air volume. The gas discharge fan 6 is adjusted by the total air volume controller 61 so that the measured total air volume is equal to the predetermined target total air volume.

After the internal airflow of the paint booth 2 becomes stable, automobile bodies start to be carried into the paint booth 2 for the start of the painting process (#6).

During the painting process, if a filter unit 41 is clogged by overspray, the individual air volume for the filter booth 4 is decreased, thereby causing a decrease in the total air volume.

The total air volume controller 61 checks whether the measured total air volume is smaller than the target total air volume to determine whether the total air volume has been decreased (#7).

If the total air volume has been decreased (Yes in #7), the painting process is suspended, and the operator checks the air volume rate of each filter booth 4. The operator adjusts the opening degree of the air volume adjusting damper 7 of any filter booth 4 with an air volume rate of smaller than 1 through operation of the corresponding damper operator (#8).

Adjusting the opening degree of the air volume adjusting damper 7 as described above changes the total air volume, which is the total of individual air volumes. The gas discharge fan 6 is thus adjusted by the total air volume controller 61 so that the measured total air volume is equal to the target total air volume (#9).

After the internal airflow of the paint booth 2 becomes stable, the operator checks the air volume rate of each filter booth 4. The operator adjusts the opening degree of the air volume adjusting damper 7 of any filter booth 4 with an air volume rate of larger than 1 through operation of the corresponding damper operator (#10).

Adjusting the opening degree of the air volume adjusting damper 7 as described above changes the total air volume, which is the total of individual air volumes. The gas discharge fan 6 is thus adjusted by the total air volume controller 61 so that the measured total air volume is equal to the target total air volume (#11).

After the internal airflow of the paint booth 2 becomes stable, the operator checks whether the measured individual air volume for each filter booth 4 is equal to the target individual air volume (#12).

Steps #8 to #12 are repeated until the measured individual air volume for each filter booth 4 is equal to the target individual air volume (No in #12).

The above procedure is as follows: The opening degree of the air volume adjusting damper 7 of the filter booth 4 with the smallest measured individual air volume is adjusted to the completely open state. The opening degree of any other air volume adjusting damper 7 is adjusted so that its measured individual air volume is equal to the smallest measured individual air volume. The gas discharge fan 6 is adjusted by the total air volume controller 61 so that the measured total air volume is equal to the predetermined target total air volume.

If the measured individual air volume for each filter booth 4 is equal to the target individual air volume (Yes in #12), the painting process is resumed (#6).

While steps #6 to #12 are repeated, if the measured total air volume shows a decrease (Yes in #7), if the opening degree of an air volume adjusting damper 7 has been adjusted (#8, #10), or if the gas discharge fan 6 has been adjusted (#9, #11), whether the filter units 41 each need replacing is determined. If, after each of steps #7 to #11, any filter unit 41 has a differential pressure as measured with use of the differential pressure measuring mechanism which differential pressure exceeds a predetermined upper limit differential pressure, it is determined that that filter unit 41 needs replacing. If it has been determined that a filter unit 41 needs replacing, an alarm is triggered to that effect.

While steps #6 to #12 are repeated, if the gas discharge fan 6 has been adjusted (#9, #11), whether the filter units 41 each need replacing is determined. If the gas discharge fan 6 has been adjusted to produce its maximum output, and any air volume adjusting damper 7 with an opening degree in the completely open state has an air volume rate of smaller than 1 (for example, an individual air volume smaller than a predetermined lower limit individual air volume), it is determined that the filter unit 41 of the filter booth 4 including that air volume adjusting damper 7 needs replacing. If it has been determined that a filter unit 41 needs replacing, an alarm is triggered to that effect.

A filter unit 41 is replaced through the following procedure: The opening degree of the air volume adjusting damper 7 included in the filter booth 4 including a filter unit 41 to be replaced is adjusted to a completely closed state. The opening degree of any other air volume adjusting damper 7 is adjusted to be larger so as to keep the total air volume achieved immediately before the air volume adjusting damper 7 included in the filter booth 4 including the filter unit 41 to be replaced became completely closed. In this state, the filter unit 41 to be replaced is detached.

After a new filter unit 41 is attached, the opening degree of the air volume adjusting damper 7 included in the filter booth 4 including the new filter unit 41 is adjusted to the initial value. The opening degree of any other air volume adjusting damper 7 is adjusted to the opening degree kept before it was adjusted to be larger.

Subsequently, the gas discharge fan 6 is adjusted by the total air volume controller 61 so that the measured total air volume is equal to the predetermined target total air volume (#5), and all the filter booths 4 have respective individual air volumes equal to one another (Yes in #4). After the internal airflow of the paint booth 2 becomes stable, the painting process is resumed (#6).

The above procedure is as follows: After a filter unit 41 is replaced, the gas discharge fan 6 is adjusted by the total air volume controller 61 so that the measured total air volume is equal to a predetermined target total air volume. The opening degree of the air volume adjusting damper 7 of the filter booth 4 with the smallest measured individual air volume is kept in the completely open state. In this state, the opening degree of any other air volume adjusting damper 7 is adjusted so that its measured individual air volume is equal to the smallest measured individual air volume.

Third Embodiment

Figure 3:
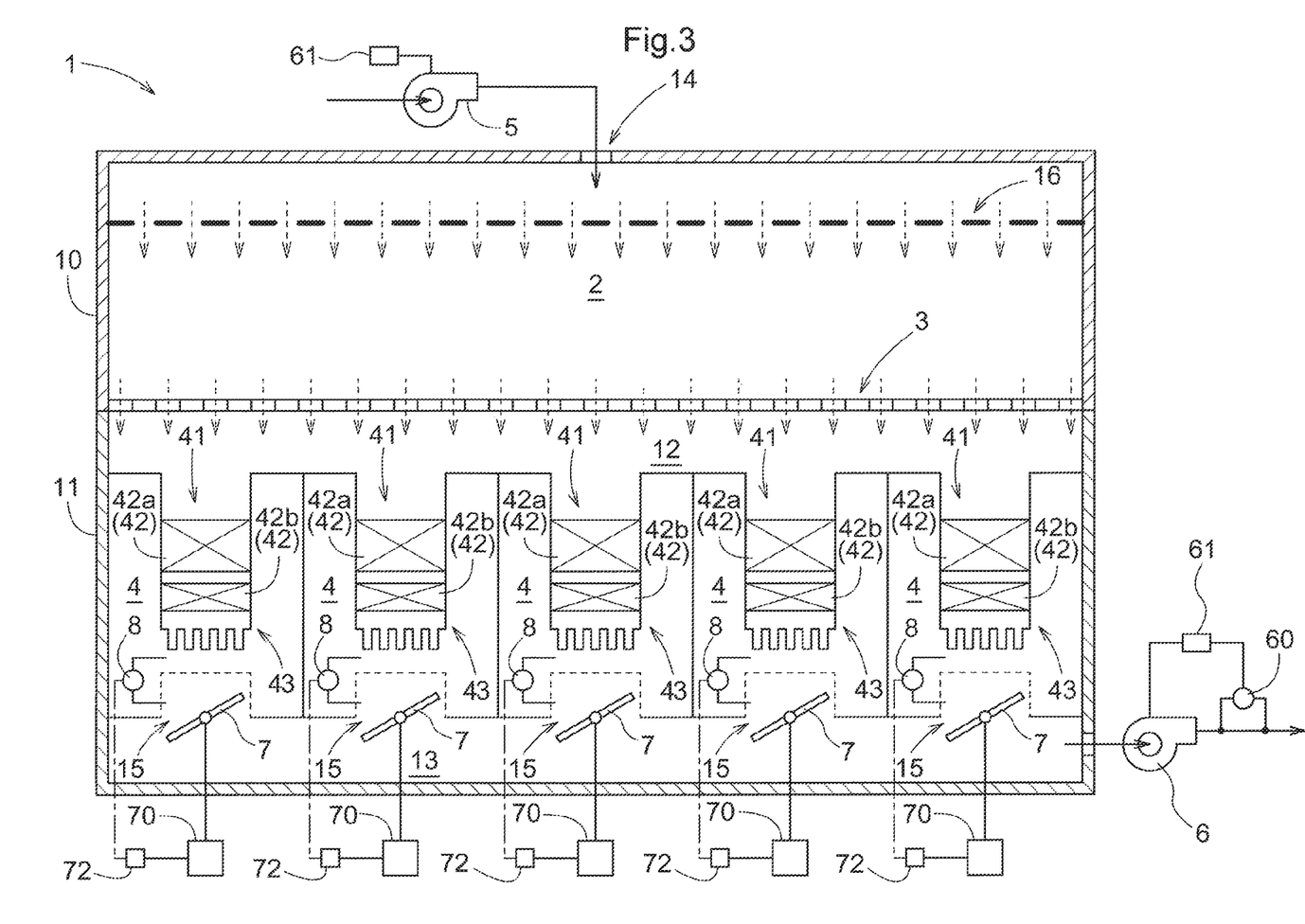
FIG. 3 is a diagram schematically illustrating the arrangement of a third embodiment of a paint facility.

The description below deals with a third embodiment of the paint facility 1 according to the present invention with reference to FIG. 3. Any member of the present embodiment that is similar to a member of the first embodiment above is assigned the same reference sign, and is not described here. The description below thus mainly deals with differences as compared to the first embodiment.

(Paint Facility)

The paint facility 1 as the present embodiment includes (i) a plurality of actuators 70 each configured to adjust the opening degree of the corresponding air volume adjusting damper 7 and (ii) a plurality of damper controllers 72 (which is an example of the "damper controlling mechanism") each configured to automatically adjust the corresponding actuator 70 on the basis of the result of measurement by the corresponding individual flowmeter 8. If, for instance, clogging due to overspray has changed the individual air volume for a filter booth 4, the damper controller 72 included in that filter booth 4 automatically adjusts the opening degree of the corresponding air volume adjusting damper 7 via the corresponding actuator 70 to change the individual air volume accordingly.

The gas discharge fan 6 included in the paint facility 1 as the present embodiment includes a total air volume controller 61 (which is an example of the "total air volume adjusting mechanism") configured to automatically adjust the output of the gas discharge fan 6 on the basis of the result of measurement by the total flowmeter 60. If, for instance, clogging due to overspray has changed the total air volume, the total air volume controller 61 automatically adjusts the gas discharge fan 6 to change the total air volume accordingly.

(Method for Adjusting Air Volume)

The description below deals with how the paint facility 1 as the present embodiment adjusts the air volume while the paint facility 1 is in operation. The overall flow is similar to the air volume adjusting method for the first embodiment above. The description below covers the overlap as well with reference to FIG. 4.

Before the start of a painting process by the paint facility 1, the opening degree of the air volume adjusting damper 7 of each filter booth 4 is adjusted by the corresponding damper controller 72 via the corresponding actuator 70 to a completely open state (#1). In this state, the air supply fan 5 and the gas discharge fan 6 are turned on. The air supply fan 5 runs at a predetermined rotation speed, while the gas discharge fan 6 is adjusted by the total air volume controller 61 so that the total air volume measured by the total flowmeter 60 is equal to a predetermined target total air volume (#2). This causes the paint booth 2 to have a predetermined target room pressure. The total air volume controller 61 stores information on the target total air volume.

After the internal airflow of the paint booth 2 becomes stable, the individual air volume for each filter booth 4 is measured with use of the individual flowmeter 8. The opening degree of the air volume adjusting damper 7 of any filter booth 4 with an air volume rate of larger than 1 is adjusted by the corresponding damper controller 72 through operation of the corresponding damper operator so that the measured individual air volume is equal to the target individual air volume (#3).

Adjusting the opening degree of the air volume adjusting damper 7 as described above decreases the total air volume, which is the total of individual air volumes (No in #4). Thus, the gas discharge fan 6 is adjusted by the total air volume controller 61 so that the measured total air volume is equal to the predetermined target total air volume (#5).

When the respective individual air volumes of all the filter booths 4 have been adjusted so as to be equal to one another (Yes in #4), information on the opening degree of each air volume adjusting damper 7 is stored in the corresponding damper controller 72 as an initial value. This is the end of the initialization.

As described above, the opening degree of each air volume adjusting damper 7 is adjusted to the completely open state. The gas discharge fan 6 is adjusted by the total air volume controller 61 so that the measured total air volume is equal to a predetermined target total air volume. Subsequently, the opening degree of the air volume adjusting damper 7 of the filter booth 4 with the smallest measured individual air volume is adjusted to the completely open state. The opening degree of any other air volume adjusting damper 7 is adjusted so that its measured individual air volume is equal to the smallest measured individual air volume. The gas discharge fan 6 is adjusted by the total air volume controller 61 so that the measured total air volume is equal to the predetermined target total air volume.

After the internal airflow of the paint booth 2 becomes stable, automobile bodies start to be carried into the paint booth 2 for the start of the painting process (#6).

During the painting process, if a filter unit 41 is clogged by overspray, the individual air volume for the filter booth 4 is decreased, thereby causing a decrease in the total air volume.

The total air volume controller 61 checks whether the measured total air volume is smaller than the target total air volume to determine whether the total air volume has been decreased (#7).

If the total air volume has been decreased (Yes in #7), the painting process is suspended, and the air volume rate of each filter booth 4 is checked by the corresponding damper controller 72. The opening degree of the air volume adjusting damper 7 of any filter booth 4 with an air volume rate of smaller than 1 is adjusted by the corresponding damper controller 72 through operation of the corresponding damper operator (#8).

Adjusting the opening degree of the air volume adjusting damper 7 as described above changes the total air volume, which is the total of individual air volumes. The gas discharge fan 6 is thus adjusted by the total air volume controller 61 so that the measured total air volume is equal to the target total air volume (#9).

After the internal airflow of the paint booth 2 becomes stable, the air volume rate of each filter booth 4 is checked by the corresponding damper controller 72. The opening degree of the air volume adjusting damper 7 of any filter booth 4 with an air volume rate of larger than 1 is adjusted by the corresponding damper controller 72 through operation of the corresponding damper operator (#10).

Adjusting the opening degree of the air volume adjusting damper 7 as described above changes the total air volume, which is the total of individual air volumes. The gas discharge fan 6 is thus adjusted by the total air volume controller 61 so that the measured total air volume is equal to the target total air volume (#11).

After the internal airflow of the paint booth 2 becomes stable, whether the measured individual air volume for each filter booth 4 is equal to the target individual air volume is checked by the corresponding damper controller 72 (#12).

Steps #8 to #12 are repeated until the measured individual air volume for each filter booth 4 is equal to the target individual air volume (No in #12).

The above procedure is as follows: The opening degree of the air volume adjusting damper 7 of the filter booth 4 with the smallest measured individual air volume is adjusted to the completely open state. The opening degree of any other air volume adjusting damper 7 is adjusted so that its measured individual air volume is equal to the smallest measured individual air volume. The gas discharge fan 6 is adjusted by the total air volume controller 61 so that the measured total air volume is equal to the predetermined target total air volume.

If the measured individual air volume for each filter booth 4 is equal to the target individual air volume (Yes in #12), the painting process is resumed (#6).

While steps #6 to #12 are repeated, if the measured total air volume shows a decrease (Yes in #7), if the opening degree of an air volume adjusting damper 7 has been adjusted (#8, #10), or if the gas discharge fan 6 has been adjusted (#9, #11), whether the filter units 41 each need replacing is determined. If, after each of steps #7 to #11, any filter unit 41 has a differential pressure as measured with use of the differential pressure measuring mechanism which differential pressure exceeds a predetermined upper limit differential pressure, it is determined that that filter unit 41 needs replacing. If it has been determined that a filter unit 41 needs replacing, an alarm is triggered to that effect.

While steps #6 to #12 are repeated, if the gas discharge fan 6 has been adjusted (#9, #11), whether the filter units 41 each need replacing is determined. If the gas discharge fan 6 has been adjusted to produce its maximum output, and any air volume adjusting damper 7 with an opening degree in the completely open state has an air volume rate of smaller than 1 (for example, an individual air volume smaller than a predetermined lower limit individual air volume), it is determined that the filter unit 41 of the filter booth 4 including that air volume adjusting damper 7 needs replacing. If it has been determined that a filter unit 41 needs replacing, an alarm is triggered to that effect.

A filter unit 41 is replaced through the following procedure: The opening degree of the air volume adjusting damper 7 included in the filter booth 4 including a filter unit 41 to be replaced is adjusted to a completely closed state. The opening degree of any other air volume adjusting damper 7 is adjusted to be larger so as to keep the total air volume achieved immediately before the air volume adjusting damper 7 included in the filter booth 4 including the filter unit 41 to be replaced became completely closed. In this state, the filter unit 41 to be replaced is detached.

After a new filter unit 41 is attached, the opening degree of the air volume adjusting damper 7 included in the filter booth 4 including the new filter unit 41 is adjusted to the initial value. The opening degree of any other air volume adjusting damper 7 is adjusted to the opening degree kept before it was adjusted to be larger.

Subsequently, the gas discharge fan 6 is adjusted by the total air volume controller 61 so that the measured total air volume is equal to the predetermined target total air volume (#5), and all the filter booths 4 have respective individual air volumes equal to one another (Yes in #4). After the internal airflow of the paint booth 2 becomes stable, the painting process is resumed (#6).

The above procedure is as follows: After a filter unit 41 is replaced, the gas discharge fan 6 is adjusted by the total air volume controller 61 so that the measured total air volume is equal to a predetermined target total air volume. The opening degree of the air volume adjusting damper 7 of the filter booth 4 with the smallest measured individual air volume is kept in the completely open state. In this state, the opening degree of any other air volume adjusting damper 7 is adjusted so that its measured individual air volume is equal to the smallest measured individual air volume.

Other Embodiments

1. The automatic adjustment by the total air volume controller or damper controllers for the above-described embodiments is not limited to any particular type, and may be based on PID control or AI control.

2. The paint facility of the present invention may, as necessary, further include a device configured to detect a lateral airflow in the paint booth and be configured to, if the device has detected a lateral airflow, adjust the air volume adjusting dampers to prevent the lateral airflow.

Although the present invention is described as above with reference to drawings, the present invention is not limited to the arrangements illustrated in the drawings, and may be embodied variously without departing from the scope of the present invention.

INDUSTRIAL APPLICABILITY

The work facility of the present invention is usable in a suitable manner particularly in such technical fields as those which involve painting the entire body of, for example, an automobile, a railway vehicle, an airplane, or a ship as well as various parts thereof and those which involve a clean room for producing, for example, a semiconductor device or a food item.

REFERENCE SIGNS LIST

1 Paint facility (which is an example of the "work facility")
10 Paint booth room
11 Filter booth room
12 Guide flow path
13 Exhaust gas flow path
14 Air supply opening
15 Discharge opening
16 Dust removing filter
2 Paint booth (which is an example of the "work booth")
3 Work floor
4 Filter booth
41 Filter unit
42 Upstream element
42a Mist separator
42b Auxiliary filter
43 Downstream element
5 Air supply fan (which is an example of the "air supply device")
6 Gas discharge fan (which is an example of the "gas discharge device")
60 Total flowmeter (which is an example of the "total air volume measuring mechanism")
61 Total air volume controller (which is an example of the "total air volume adjusting mechanism")

7 Air volume adjusting damper
70 Actuator
71 Damper operator
72 Damper controller (which is an example of the "damper controlling mechanism")
8 Individual flowmeter (which is an example of the "individual air volume measuring mechanism")

The invention claimed is:

1. A work facility, comprising:
a work booth in which work is performed on a work target;
a plurality of filter booths including respective filter units configured to allow emission gas emitted from the work booth to flow through the filter units for removal of a removal target contained in the emission gas;
a gas discharge fan configured to cause exhaust gas to be discharged from the filter booths from which exhaust gas the removal target has been removed;
a plurality of air volume adjusting dampers, each corresponding to one of the plurality of filter booths, the plurality of air volume adjusting dampers having respective opening degrees adjustable to change respective individual air volumes of the exhaust gas to be discharged from the respective filter booths;
a plurality of individual air flow meters, each corresponding to one of the plurality of filter booths and one of the plurality of air volume adjusting dampers, the plurality of individual air flow meters adapted to measure the respective individual air volumes;
a total air volume adjusting mechanism adapted to adjust an output of the gas discharge fan to change a total air volume, which is a total of the individual air volumes, the total air volume adjusting mechanism comprises an inverter configured to change the total air volume; and
a total air flow meter adapted to measure the total air volume, wherein
the opening degree of the air volume adjusting damper that corresponds to a smallest measured respective individual air volume is configured to be adjusted to a completely open state, whereas the opening degree of any of the other air volume adjusting dampers is configured to be adjusted so that the corresponding measured respective individual air volume is equal to a new smallest measured individual air volume,
the gas discharge fan is adjusted by the total air volume adjusting mechanism so that the total air volume measured by the total air flow meter is equal to a predetermined target total air volume, and
before the opening degrees of the air volume adjusting dampers and the gas discharge fan are adjusted, the respective opening degrees of the air volume adjusting dampers are each adjusted to the completely open state, and the gas discharge fan is adjusted by the total air volume adjusting mechanism so that the total air volume measured by the total air flow meter is equal to the predetermined target total air volume.

2. The work facility according to claim 1, wherein
when operation of the work facility is suspended and is resumed later, the respective opening degrees of all the air volume adjusting dampers are in respective states in which the respective opening degrees were immediately before the suspension.

3. The work facility according to claim 1, wherein
the respective opening degrees of the air volume adjusting dampers are manually adjustable directly or indirectly.

4. The work facility according to claim 1, further comprising:

a plurality of damper controllers configured to adjust the respective opening degrees of the air volume adjusting dampers on a basis of the respective individual air volumes, wherein
the respective opening degrees of the air volume adjusting dampers are each automatically adjustable by the corresponding one of the damper controllers.

5. The work facility according to claim 1, wherein
in a case where (i) the output of the gas discharge fan has become maximum as a result of the total air volume adjusting mechanism adjusting the gas discharge fan, and (ii) the individual air volume for one of the filter booths which corresponds to one of the air volume adjusting dampers whose opening degree is in the completely open state, the individual air volume being measured by a corresponding one of the individual air flow meters, is lower than a predetermined lower limit individual air volume,
the work facility is configured to prompt replacement of said one of the filter units corresponding to said one of the filter booths.

6. The work facility according to claim 1, wherein
when one of the filter units is to be replaced,
the filter unit to be replaced is detachable in a state where the opening degree of the one of the air volume adjusting dampers which corresponds to the one of the filter booths which includes the filter unit to be replaced is adjusted to a completely closed state, whereas the opening degree of any other one of the air volume adjusting dampers is configured to be adjusted to be larger so as to keep the total air volume achieved immediately before the one of the air volume adjusting dampers which corresponds to the one of the filter booths which includes the filter unit to be replaced became completely closed, and
after a replacement filter unit is attached,
the opening degree of the one of the air volume adjusting dampers which corresponds to the one of the filter booths which includes the replacement filter unit is adjusted to an opening degree equal to the opening degree to which the one of the air volume adjusting dampers which corresponds to the one of the filter booths which includes the replacement filter unit was adjusted when the filter unit having been replaced was unused, whereas the opening degree of said any other one of the air volume adjusting dampers is configured to be adjusted back to an opening degree that said any other one of the air volume adjusting dampers had before the opening degree of said any other one of the air volume adjusting dampers was adjusted to be larger.

7. The work facility according to claim 6, wherein
after said one of the filter units is replaced,
(i) the gas discharge fan is configured to be adjusted by the total air volume adjusting mechanism so that the total air volume measured by the total air flow meter is equal to the predetermined target total air volume, and
(ii) the opening degree of one of the air volume adjusting dampers which corresponds to one of the filter booths for which the individual air volume measured by the corresponding one of the individual air flow meters is smallest among the respective individual air volumes for the filter booths is configured to be kept in the completely open state, whereas the opening degree of any other one of the air volume adjusting dampers is configured to be adjusted to the opening degree such that that the individual air volume measured by the corresponding one of the individual air flow meters is equal to the smallest individual air volume.

8. The work facility according to claim 1, wherein
the work is painting,
the work target is a paint target, and
the work booth is a paint booth.

\* \* \* \* \*

UNITED STATES PATENT AND TRADEMARK OFFICE
CERTIFICATE OF CORRECTION

PATENT NO. : 11,192,132 B2
APPLICATION NO. : 17/051386
DATED : December 7, 2021
INVENTOR(S) : Koike et al.

Page 1 of 1

It is certified that error appears in the above-identified patent and that said Letters Patent is hereby corrected as shown below:

In the Claims

Column 19, Lines 16-18, Claim 1, delete "a gas discharge fan configured to cause exhaust gas to be discharged from the filter booths from which exhaust gas the removal target has been removed;" and insert -- a gas discharge fan configured to cause exhaust gas to be discharged from the filter booths from which the removal target has been removed; --

Column 20, Lines 63-66, Claim 7, delete "whereas the opening degree of any other one of the air volume adjusting dampers is configured to be adjusted to the opening degree such that that the individual air volume measured by the corresponding one of the individual air flow meters is equal to the smallest individual air volume." and insert -- whereas the opening degree of any other one of the air volume adjusting dampers is configured to be adjusted to the opening degree such that the individual air volume measured by the corresponding one of the individual air flow meters is equal to the smallest individual air volume. --

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*